United States Patent Office 3,489,812
Patented Jan. 13, 1970

---

3,489,812
METHOD OF PREPARING BIS-(DIETHYL SULFIDE)-DECABORANE
Mervin D. Marshall, Fombell, and Richard M. Hunt and Gerald T. Hefferan, Butler, Pa., assignors to Mine Safety Appliances Company, a corporation of Pennsylvania
No Drawing. Filed Jan. 15, 1968, Ser. No. 697,596
Int. Cl. C07f 5/02
U.S. Cl. 260—606.5   1 Claim

ABSTRACT OF THE DISCLOSURE

Bis-(diethyl sulfide)-decaborane is prepared by reaction of ammonium decahydrodecarborate, HCl and diethyl sulfide.

---

Bis-(dialkyl sulfide)-decaboranes, such as bis-(dimethyl sulfide)-decaborane, $B_{10}H_{12}[S(CH_3)_2]_2$, and bis-(diethyl sulfide)-decaborane, $B_{10}H_{12}[S(C_2H_5)_2]_2$, have been used to prepare carboranes, which are particularly useful as high temperature dielectric materials, by reaction with acetylene or other alkyenes, as, for example, described by T. L. Heying et al., Inorg. Chem. 2, 1089 (1963), and Muetterties and Kribb, Chem. & Eng. News, May 9, 1966, page 91. Heretofore bis-(diethyl sulfide)-decaborane has been prepared by reaction of diethyl sulfide with decaborane, an extremely expensive reactant.

In accordance with this invention, bis-(diethyl sulfide)-decaborane is prepared by the reaction of ammonium decahydrodecaborane, $(NH_4)_2B_{10}H_{10}$, and hydrogen chloride, HCl, in diethyl sulfide.

Ammonium decahydrodecaborate was made from tetraalkylammonium decahydrodecaborates by conventional replacement of the tetraalkylammonium ion by ammonium ion on an ion exchange resin. For example, 550 cc. of Dowex 50 WX-8, a cation exchange resin available from Dow Chemical Company, was conditioned by washing with 5 liters of 4.4 percent hydrochloric acid and then water-washed until the eluent was acid-free. Five mole (270 g.) of $NH_4Cl$ was then slowly passed through the ion exchange resin, and then the column was washed with water until the washings were neutral to $AgNO_3$. Tetramethylammonium decahydrodecaborate (115.5 g.) dissolved in 240 ml. of water was passed through the $NH_4^+$ form resin at about 100 ml. per hour. The product

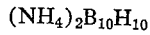

(5.9 g.) was recovered by evaporation of the resultant water solution.

Tetraalkylammonium decahydrodecaborates may be prepared by the pyrolysis of tetraalkylborohydride or tetraalkyl octahydrotriborates as disclosed in the co-pending applications of Makhlouf and Hefferan, Ser. No. 579,198, now Patent No. 3,373,202, and Makhlouf and Hough, Ser. No. 579,220, now Patent No. 3,373,203, both filed Sept. 14, 1966, and of common ownership with this application.

The reaction of ammonium decahydrodecaborate with hydrogen chloride in diethyl sulfide proceeds according to the equation:

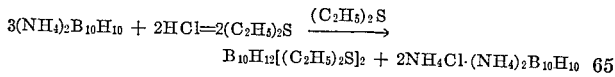

Temperature is not critical and the reaction proceeds readily at 0° C. to 25° C., although higher or lower temperatures may be used if desired. The proportions of reactants is likewise not critical to operability, although it is generally preferred for improved yields and reaction rates to use in excess of a stoichiometric amount of HCl and sufficient dialkyl sulfide to permit convenient stirring of the reactant mixture. The reaction should be carried out in the absence of air or other oxidizing gas, suitably by using a vacuum or nonoxidizing cover gas such as nitrogen or argon.

The following examples are illustrative of this invention:

EXAMPLE I

A glass reactor equipped with a magnetic stirrer and connected to a glass vacuum apparatus was charged with 3.513 g. of $(NH_4)_2B_{10}H_{10}$ (22.6 millimols) and 40 ml. of diethyl sulfide, cooled to about 4° C. and evacuated. Measured aliquots of anhydrous hydrogen chloride (92 mmoles) were added in two equal increments. This reaction mixture was allowed to warm to room temperature and stirred for 72 hours. A white precipitate formed which was filtered from the diethyl sulfide solution. The evaporation of excess diethyl sulfide from the solution gave 4.596 g. of a yellowish solid product which was identified as $B_{10}H_{12}[(C_2H_5)_2S]_2$ by infrared, nmr, and X-ray analyses.

EXAMPLE II 2.18 g. (14.1 mmol) of $(NH_4)_2B_{10}H_{10}$ was slurried in 15 ml. of diethyl sulfide at room temperature under a nitrogen atmosphere. A solution of 30 mmol of HCl in 20 ml. of diethyl sulfide was added to the slurry and stirred at room temperature for 22 hours. The reaction mixture was filtered, separating 1.96 g. of solid double salt $$NH_4Cl \cdot (NH_4)_2B_{10}H_{10}$$

and a diethyl sulfide solution. On evaporation of the diethyl sulfide 1.301 g. of product, identified as

by infrared analysis was recovered. The elemental analysis of the product was B: 32.1 milliatoms (mats)/g.; C: 24.8 mats/g.; H: 103.2 mats/g.; S: 20.3%, as compared to the theoretical values for bis-(diethyl sulfide)-decaborane of B: 33.32 mats/g.; C: 26.59 mats/g.; H: 106 mats/g.; and S: 21.3%.

It is believed that the reaction of this invention is the first in which the $B_{10}H_{10}^{2-}$ cage has been opened to reestablish the decaborane skeleton. The reaction is particularly significant in that, with the preparation of ammonium decahydrodecaborate, it permits a route for preparing $B_{10}H_{12}(R_2S)_2$, other $B_{10}H_{12}(base)_2$ compounds and carboranes that do not require the use of decaborane.

According to the provisions of the patent statutes, we have explained the principle and mode of practice of our invention and have described what we now consider to represent its best embodiment. However, we desire to have it understood that, within the scope of the appended claim, our invention may be practiced otherwise than as specifically described.

We claim:
1. A method of preparing bis-(diethyl sulfide)-decaborane comprising reacting ammonium decahydrodecaborate and hydrogen chloride in the presence of diethyl sulfide.

References Cited

UNITED STATES PATENTS

| | | | |
|---|---|---|---|
| 3,149,163 | 9/1964 | Knoth | 260—606.5 X |
| 3,154,561 | 10/1964 | Muetterties | 260—606.5 X |
| 3,247,256 | 4/1966 | Fein et al. | 260—606.5 |
| 3,328,422 | 6/1967 | Knoth | 260—606.5 X |

DELBERT E. GANTZ, Primary Examiner
W. F. W. BELLAMY, Assistant Examiner